(12) United States Patent
Leebow

(10) Patent No.: US 8,149,209 B1
(45) Date of Patent: Apr. 3, 2012

(54) COMPUTER INTERFACE SYSTEM

(76) Inventor: Eric Leebow, New York, NY (US)

( * ) Notice: Subject to any disclaimer, the term of this patent is extended or adjusted under 35 U.S.C. 154(b) by 797 days.

(21) Appl. No.: 11/611,444

(22) Filed: Dec. 15, 2006

Related U.S. Application Data

(60) Provisional application No. 60/750,933, filed on Dec. 16, 2005.

(51) Int. Cl.
G09G 5/00 (2006.01)
(52) U.S. Cl. .................. 345/156; 345/167; 345/184
(58) Field of Classification Search ........... 345/156–184
See application file for complete search history.

(56) References Cited

U.S. PATENT DOCUMENTS

| | | | |
|---|---|---|---|
| 6,130,726 A * | 10/2000 | Darbee et al. | 348/734 |
| 6,666,377 B1 * | 12/2003 | Harris | 235/462.25 |
| 6,891,527 B1 * | 5/2005 | Chapman et al. | 345/158 |
| 7,508,977 B2 * | 3/2009 | Lyons et al. | 382/154 |
| 2002/0023010 A1 * | 2/2002 | Rittmaster et al. | 705/26 |
| 2003/0052860 A1 * | 3/2003 | Park et al. | 345/156 |
| 2004/0155865 A1 * | 8/2004 | Swiader | 345/161 |
| 2006/0046793 A1 * | 3/2006 | Hamilton et al. | 455/575.1 |
| 2007/0247439 A1 * | 10/2007 | Daniel et al. | 345/173 |
| 2007/0260338 A1 * | 11/2007 | Tseng | 700/70 |

OTHER PUBLICATIONS

M.A. Siraj, Data Can Now Be Stored on Paper, Arab News, Nov. 18, 2006, 2 pages, 27 Shawwal, 1427.
Welcome to Mobiqa, www.mobiqa.com, 2006.
Mytago do magic with your phone, www.mytago.com.
Thomas Claburn, New HP Wireless Chip Connects the Digital and Real Worlds, Information Week, Jul. 17, 2006, 2 pages, Article ID 190500331, 2006.
SCANBUY Shopper, www.scanbuy.com, 2006.
Shoot and Scan—New software that connects your camera phone to the mobile Internet when you hold it up to a bar code, www.wirelessmoment.com/Barcodes_20_2D_20WSJ_20chart_20of_20camera_20phone_20sofeware_2.jpg, Source: WSJ.
Coca Cola Mexico launches 40,000,000 Sprite bottles with ShotCodes, ShotCode.com. 2003-2006 OP3 B.V.
Adam Aston, Developments to Watch, BusinessWeek Online, www.businessweek.com/print/magazine/content/06_14/c3978077htm?chan=mz, Apr. 3, 2006, 2 pages, 2003-2006, The McGraw-Hill Companies Inc.

* cited by examiner

Primary Examiner — Amare Mengistu
Assistant Examiner — Dmitriy Bolotin

(57) ABSTRACT

A user interface system includes a data receiving device and a portable data device having a memory. The portable data device may include a wireless interface configured to transmit data stored in the memory. A user may interface with the data receiving device by physically manipulating the portable data device.

19 Claims, 15 Drawing Sheets

COMPUTER INTERFACE SYSTEM

CROSS-REFERENCE TO RELATED APPLICATIONS

This application claims priority to U.S. Provisional Application Ser. No. 60/750,933, filed Dec. 16, 2005.

FIELD OF THE INVENTION

The present application generally relates to a computer interface system and, more particularly, to a system that facilitates connecting physical items to a search engine, the Internet, and other networks.

BACKGROUND

Personal computers typically have interface devices including keyboards, mice, tablets, trackballs, and memory drives. Also there are an ever increasing number of devices that interface with personal computers either wirelessly or through a hard line.

The Internet is typically accessed by individuals using computing devices and is used for ever increasing purposes. The Internet is used for communication, banking, shopping, research and more. However, use of the Internet is limited by the computer interfaces that are currently available.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. The drawings may not be to scale and the proportion of certain elements may be exaggerated for the purpose of illustration.

The specific design features of the computer interface system as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

It will be apparent to those skilled in the art that many uses and design variations are possible for the improved computer interface system disclosed herein. Other embodiments suitable for other applications will be apparent to those skilled in the art given the benefit of this disclosure.

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmed logic device, memory device containing instructions, or the like. Logic may also be fully embodied as software.

"Signal", as used herein, includes but is not limited to one or more electrical or optical signals, analog or digital signals, one or more computer or processor instructions, messages, a bit or bit stream, or other means that can be received, transmitted, and/or detected.

"User", as used herein, includes but is not limited to one or more persons, software, computers or other devices, or combinations of these.

Figure 1:
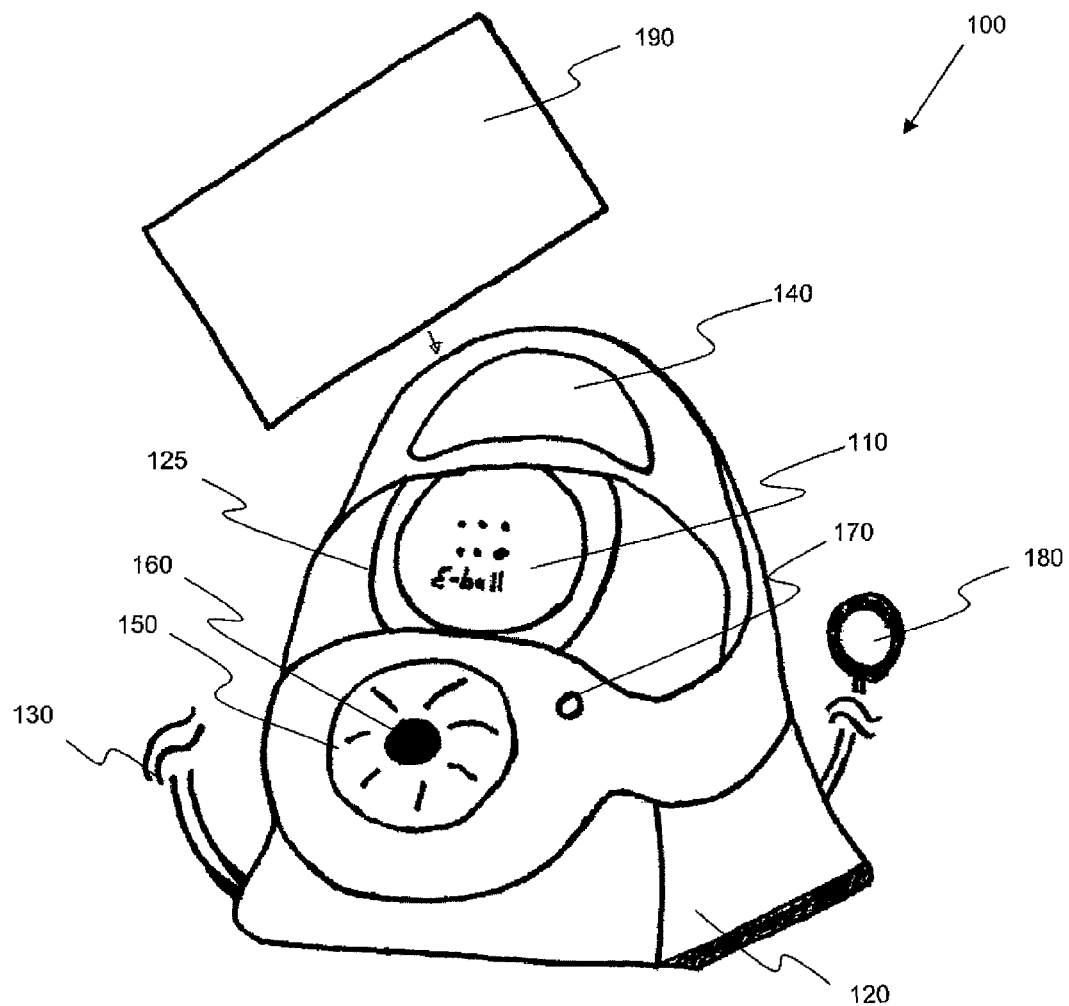
FIG. 1 is a perspective view of one embodiment of a computer system configured to interface with a portable data device.

FIG. 1 illustrates one embodiment of a computer interface system 100 configured to interface with a portable data device 110. The illustrated computer interface system includes a docking station 120, (also referred to as an S-Operator, or a data receiving device) in data communication with a network, such as a LAN, a WAN, the Internet, a wireless network, or any known mobile or telecommunications network of computing devices through a communication line 130. The communication line may be any known connections, such as copper wire, a telephone line, an Ethernet line, a USB connector, a Firewire connector, an IEEE 1394 connector, an RS-232 connector, a coaxial cable. In one embodiment, the communication line 130 is physically connected to a computer which, in turn, is in data communication with other devices over a network. In an alternative embodiment (not shown), the docking station 120 does not include a communication line and instead is in wireless communication with a computer which, in turn, is in data communication with other devices over a network. The wireless communication with the docking station and the computer may be one of an infrared transmission, radio frequency transmission such as Bluetooth transmission, or any other known wireless communication means. In yet another alternative embodiment (not shown), the docking station 120 is directly connected to a network without using an inteiinediary computer. The docking station may be directly connected to a network through any of the above described wire line or wireless connections.

As shown in FIG. 1, the illustrated docking station 120 has a socket 125 for receiving and holding the portable data device 110 such that the portable data device 110 may be placed in signal communication with the docking station 120. In the illustrated embodiment, the portable data device 110 is ball-shaped and may be referred to as an E-Ball or a Search-Ball. In this embodiment, the portable data device can function as both a data storage unit and a track-ball for interfacing with a computer. In one embodiment, the portable data device 110 has internal scanning logic that can extract information from physical objects.

Figure 2:
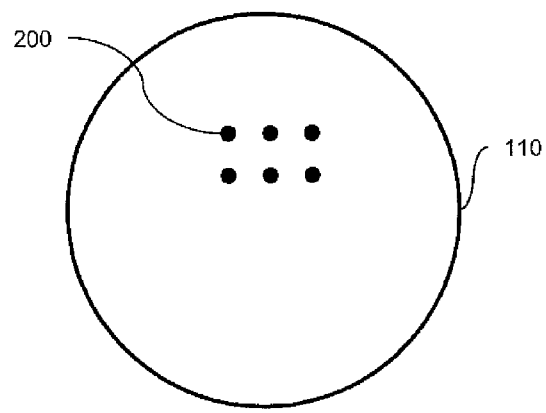
FIG. 2 is a front plan view of one embodiment of a portable data device.

In the illustrated embodiment, the portable data device 110 is sized and shaped to cooperate with the socket 125 of the docking station 120. As best shown in FIG. 2, the portable data device 110 is ergonomically shaped to be substantially spherical or ball-shaped. It is noted, however, that the portable data device 110 can alternatively be any other suitable shape such as, for example, a truncated-sphere, a disk, a block, or the like. In the illustrated embodiment, the portable data device 110 is a hand-held, mobile device that works in tandem with the docking station 120. The portable device may be connected to Internet or it may be interfaced through a docking station 120 without connecting to the Internet. In one embodiment, the portable data device 110 has internal scanning logic to receive information based on an indicia, radio frequency identification (RFID), and/or any other suitable technology.

With continued reference to FIG. 2, the illustrated portable data device 110 can wirelessly interact with a portable drive or storage device (not shown). In the illustrated embodiment, the portable data device 110 also has a microphone 200 configured to receive voice information from the user and/or other sound information. In one embodiment, the microphone can be used to perform search functions based on audible commands from a user. In this embodiment, the search functions may be performed internally. For example, the portable data device 110 may search for a file or other data stored on the portable data device. The search functions may also be performed on an external computer or a network, such as the Internet, when the portable data device 110 is connected to a computer or a network, either directly or through a docking station.

In one embodiment, the portable data device 110 can also be used as a chat Voiceover (VOIP) microphone and/or to dictate words or email into the computer. In one embodiment, the portable data device 110 has a built-in GPS device and user identification information for the person who uses the portable data device 110.

In one embodiment, the portable data device 110 can tag virtually any item via wireless technology. Information can be saved onto the portable data device 110, and the portable data device 110 can also be used as a mouse, track-ball, or other such pointer/curser mover. In one embodiment, the user can speak into the portable data device 110. The user's spoken word can then be transferred to the docking station 120 which transfers the spoken word to a search engine or application.

The portable data device 110 can be configured for performing many functions such as, for example, storing and saving data, opening doors, transacting with parking meters/toll booths, tracking dogs/pets, locating people, functioning as a ticket, listening to music, interacting with appliances, cooperating with restaurants, providing payment online or at a retail location, and the like.

Storage and Saving Data: The portable data device 110 can act as a portable mass storage device. In this embodiment, data can be transported with a user without the need for carrying a laptop computer. In one embodiment, data can be stored on and retrieved from a portable data device 110 by using a docking station 120. In an alternative embodiment, data can be directly stored on and retrieved from the portable data device without using a docking station.

Opening Doors/Unlocking Secured Items: The portable data device 110 can be programmed to open doors to a home, secured areas at work, a car, or the like. Similar to a key fob, there is no need for keys that you have to turn to unlock a door.

Parking Meters/Toll Booths: The portable data device 110 can act as a transaction device like a charge card, and can be either swiped, or read by proximity, wired or wirelessly. The portable data device 110 can be used in place of change for suitably configured parking meters and toll booths.

Pets: The portable data device 110 can be attached to a pet and its location can be shown on a map screen of a computer device when a user searches for the pet. This pet portable data device 110 can be the same as the portable data device 110 described above, or alternatively, the portable data device can be specifically designed for use by the pet.

People Finding: Any person who has a portable data device 110 can be shown on a map screen where they are located in real time.

Tickets: A sports or other event can be attended with a portable data device 110 instead of carrying a ticket. An electronic ticket can be downloaded onto the portable data device 110. Also, airline or other travel tickets can be downloaded onto the portable data device 110 via the Internet.

Music: The portable data device 110 can be used to listen to music. A user may record and save music on the portable data device 110. In one embodiment, the microphone on the portable data device 110 may be used to search for music using audible commands.

Providing Payment: In one embodiment, a user may store credit card or bank account information on the portable data device 110. In an e-commerce environment, the portable data device 110 may function as an e-wallet. When the portable data device 110 is docked in a docking station 120, the docking station 120 may retrieve credit card or bank account information from the user without requiring the user to manually enter such information. In a brick-and-mortar environment, a retail store may provide a docking station or a scanning device at a checkout counter. The docking station or scanning device may be configured to retrieve credit card or bank account information from the user. In both the e-commerce and brick-and-mortar embodiments, the credit card or bank account information may be encrypted to prevent an unauthorized user from accessing the information.

Restaurants: The portable data device 110 can notify you when your table is ready at a restaurant. Thus the portable data device 110 is the user's own table tag.

Figure 3:
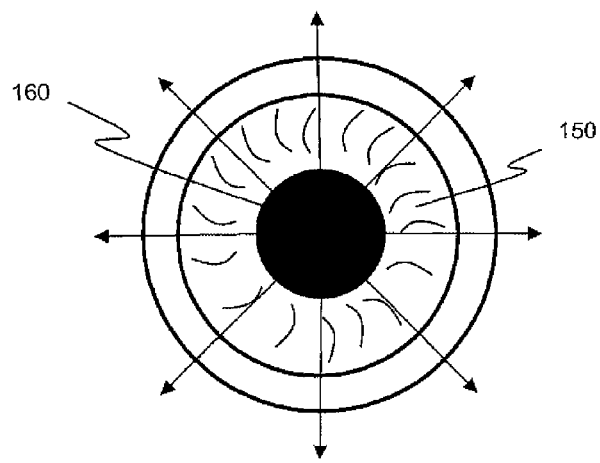
FIG. 3 is a top plan view of one embodiment of a joystick configured to interface with a computer system.

Returning now to FIG. 1, the illustrated docking station 120 further includes a scanner 140. The scanner 140 is configured to scan objects optically, scan objects using radio frequency, or scan objects with any other known means of scanning. In the illustrated embodiment, the docking station 120 also includes a joy-stick 150. The free end of the joy stick is provided with a button switch 160, which may be referred to as a "you are here button." As can be seen in FIG. 3, the joy-stick 150 may be configured to move in any direction in an X-Y plane.

Returning again to FIG. 1, the docking station 120 is further provided with suitable logic to wirelessly interact with other devices such as, for example, a mobile phone, a personal digital assistant (PDA), a mouse, a pen, or the like. It is noted that any other desired input device can be additionally or alternatively provided.

The illustrated docking station 120 also includes an indicator light 170 and is suitably connected to a speaker 180. With a speaker 180 connected, the docking station 120 can enhance the user's Internet experience by audibly reading emails, websites, or any other written material with a built-in screen reader. In an alternative embodiment (not shown) the docking station 120 can have a built-in speaker.

Any physical object with compatible technology such as, for example RFID or indicia (such as a barcode or other known symbol) can be used with the docking station 120. For example, data cards 190 can be scanned by simply waving the data card 190 in front of the scanner 140. In one embodiment, the indicator light 170 is initially red but turns green upon acceptance of the data card 190 or other physical object. It should be understood that any color scheme may be used to indicate actions.

The data cards 190 provide a convenient format for carrying media. For example, the data cards 190 may store books, music, software, video, shipping and tracking information, greeting cards, X-rays and sonograms, photographs, prescriptions, coupons, other media, and the like. In one embodiment the data cards 190 are about the size of credit cards or discount coupon cards. After the data cards 190 have been scanned by the scanner 140, a user can search for the cards with a personal desktop installation on a computer desktop connected to the docking station 120. In one embodiment, the cards 190 are shown on the desktop with icons that represent books, music, software, video, shipping and tracking information, greeting cards, X-rays and sonograms, photographs, prescriptions, coupons, other media, and the like. The data cards 190 may store data by using indicia, such as a bar code or geometric shapes such as circles, squares, and triangles. Additionally, the indicia may combine various colors and preserve the data in images.

In one embodiment, the data cards 190 store a pointer or a reference to a database entry. In this embodiment, when a user scans a data card 190 with a scanner 140 of a docking station 120, the pointer stored on the data card indicates a web site or a database location. The docking station 120 then retrieves (or instructs an associated computer to retrieve) the data from the reference web site or database location.

In an alternative embodiment, the data cards 190 are embedded with digital files that store the data of interest. In this embodiment, when a user scans a data card 190 with a scanner 140 of a docking station 120, the subject data in its entirety is downloaded from the data card 190 to the docking station 120 without reference to a web site or an external database.

In one embodiment, the data card 190 may be encoded for a single use. In this embodiment, after the data card has been scanned once, the information on the card can no longer be uploaded to another device. In this manner, valuable information such as proprietary software, music, or videos can be protected from piracy. In an alternative embodiment, the data card 190 does not contain such safeguards and can be scanned numerous times. In this manner, promotional information and other data can be freely and quickly distributed.

In an alternative embodiment (not shown), the scanner may be used with other physical objects, such as disks, chips, clothing, magazines, newspapers, books, fingerprints, tattoos, food products, or any known physical object. Any physical object may bear an indicia that is associated with a pointer or a reference to a database entry. For example, a person's thumbprint may be associated with an individual's website or an individual's bank account or a newspaper advertisement may include an indicia associated with a product's website. Alternatively, the physical object may be embedded with digital files that store the data of interest. For example, a newspaper advertisement may include indicia that is an embedded digital file for a coupon for the advertised product. It should be understood that the given examples are not meant to be limiting and that any object may include a reference or pointer to any database, and that any object may be embedded with digital files that store any type of data.

In one embodiment, the data card 190 is a book card. A book card contains a book and can be used with a docking station 120 or an e-book device. Instead of carrying heavy books or audio books, the user simply scans the book card with the docking station 120 and the book is available to be read on the computer. In one embodiment, a book card contains the actual books. In an alternative embodiment, the book card is a promotional book card that promotes books and can be used to purchase or access the books online and charge the user's portable data device 110 or credit card.

In another embodiment, the data card 190 is a music card. A music card contains music and can be used with a docking station 120 or an MP3 player device. Instead of carrying CDs or cassettes, a user simply scans the music card with the scanner 140 on the docking station 120 and the music is available on the computer or device which can be synched with the computer. In one embodiment, a music card contains the actual music. In an alternative embodiment, the music card is a promotional music card that promotes music and can be used to purchase, access, or download the music online and charge the user's portable data device 110 or credit card.

In yet another embodiment, the data card 190 is a software card. A software card contains software and can be used with a docking station 120 and/or a computer. The software card 190 may include, for example, software such as "Hooked on Phonics," various games, or any other known software. The user simply scans the software card with the scanner 140 on the docking station 120 and the software is available to use on the computer. In one embodiment, a software card contains the actual software. In an alternative embodiment, the software card is a promotional software card that promotes software and can be used to purchase or access the software online and charge the user's portable data device 110 or credit card.

In an alternative embodiment, the data card 190 is a video card that contains a digital movie or other video and can be used with a docking station 120, a computer, a television, or a home entertainment system. Instead of carrying DVD or video cassette, the user simply scans the video card with the scanner 140 on the docking station 120 and the video is available to view on the computer. In one embodiment, a video card contains the actual video. In an alternative embodiment, the video card is a promotional video card that promotes video and can be used to purchase, access, or download the video online.

In another alternative embodiment, the data card 190 is a shipping and tracking card. Shipping and tracking cards contain indicia representing tracking numbers from carriers such as, for example, UPS, FedEx, and USPS. The shipping and tracking card can be scanned by the scanner 140 on the docking station 120. In one embodiment, the docking station 120 reads the indicia or RFID which represents the tracking number and enters the tracking number into a search engine. In one embodiment, the user can view tracking information by pressing the button 160 on the joystick 150.

In another alternative embodiment, the data card 190 is a greeting card. The greeting card can be scanned by the scanner 140 on the docking station 120. In one embodiment, the docking station 120 scans the greeting card and an animated card is displayed on the computer.

In yet another alternative embodiment, the data card 190 is an x-ray/sonogram card that contains medical images and can be scanned by the scanner 140 on the docking station 120. For example, a doctor can provide an x-ray card containing an x-ray image of a patient. The patient may the scan the x-ray card with the scanner 140 on the docking station 120 to view the x-ray on the patient's computer.

In another alternative embodiment, the data card 190 is a photograph card. A photograph card contains digital photographs and can be scanned by the scanner 140 on the docking station 120. In one embodiment, a user scans the photograph card with the scanner 140 on the docking station 120 and the photographs can be seen on the computer.

In another alternative embodiment, the data card 190 is a prescription card. A prescription card contains a digital prescription and can be scanned by the scanner 140 on the docking station 120. In one embodiment, a user scans the prescription card with the scanner 140 on the docking station 120 and the prescription on the card may be logged, entered, and/or filled online.

In another alternative embodiment, the data card 190 is a coupon/discount card. Coupon/discount cards contain digital coupons and can be scanned by the scanner 140 on the docking station 120. For example, a retailer can provide consumers with the coupon card. A consumer may then scan the coupon card with the scanner 140 on the docking station 120 and thereby retrieve a coupon online.

The docking station 120 can also be used for scanning many other physical objects such as, for example, calculators, clothes, advertising/catalogues, and the like.

Advanced and scientific calculators with graphing capabilities can wirelessly interact with the docking station 120 through use of wireless technology such as, for example, infrared, radio frequency, Bluetooth, or any other know wireless communication methods. In one embodiment, calculator entries are displayed on the computer, calculated with a search engine, and retrieved with desktop search technology.

Personal items such as clothing articles with scannable labels or RFID technology can be scanned by the scanner 140 on the docking station 120 so that the information is entered into the computer. In one embodiment, the clothes are displayed on the computer and can be searched using a search engine. In another embodiment, the clothing designer's website is displayed on the computer. In another embodiment, promotional videos are displayed on the computer. In yet another embodiment, a discount coupon is displayed on the computer. In another embodiment, a third party may embed any type of information into the clothing, and the information is displayed on the computer after the clothing has been scanned.

Catalogs or advertisements can also be scanned by the scanner 140 on the docking station 120. In one embodiment, the card or other object can provide a digital catalog that can be displayed on the computer and can be searched using a search engine.

Figure 4:
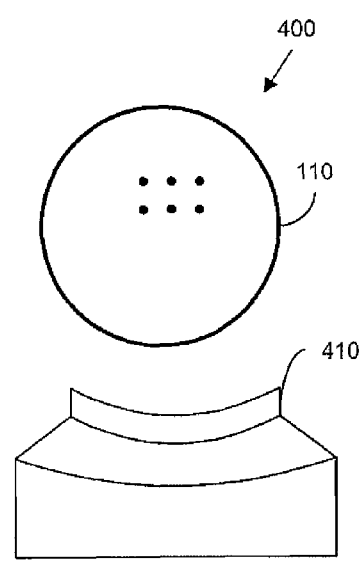
FIG. 4 is a front plan view of one embodiment of a portable data device interfacing with a socket of a docking system.

Turning now to FIG. 4, a simplified computer interface system 400 is illustrated. In this embodiment, the simplified computer interface system 400 includes a portable data device 110 and a simplified socket 410. The user can simply spin the portable data device 110 near or on the socket 410 to wirelessly interact with the socket 410. The socket may be employed on a docking station 120 or may be a component of a built-in docking station for any number of electronic devices, as will be described further below.

Figure 5:
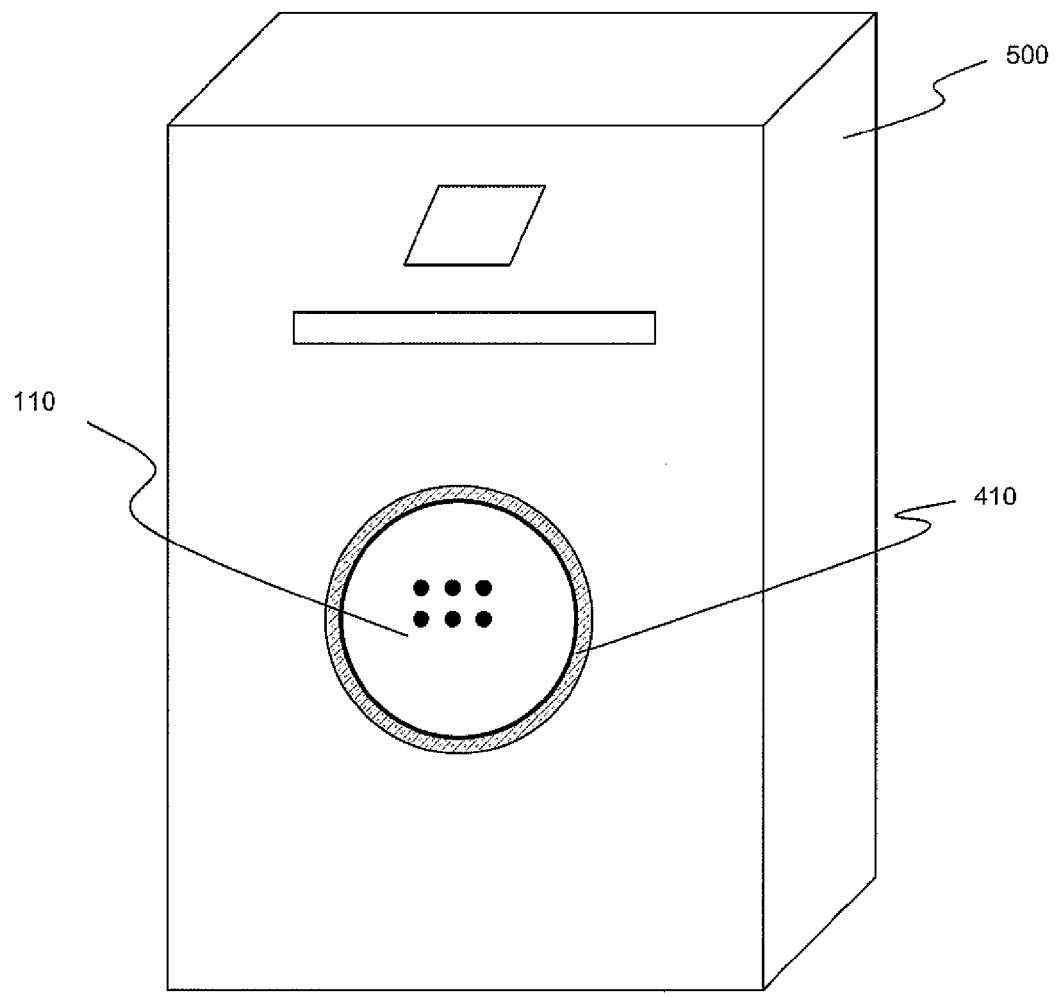
FIG. 5 is a perspective view of one embodiment of a central processing unit configured to interface directly with a portable data device.

FIG. 5 illustrates one embodiment of an interface system employing a computer 500 or other device controlled by a central processing unit (CPU). The computer 500 includes a built-in docking station with a socket 410 for receiving the portable data device 110. In this embodiment, the computer 500 can perform the same functions described above with respect to the docking station 120.

Figure 6:
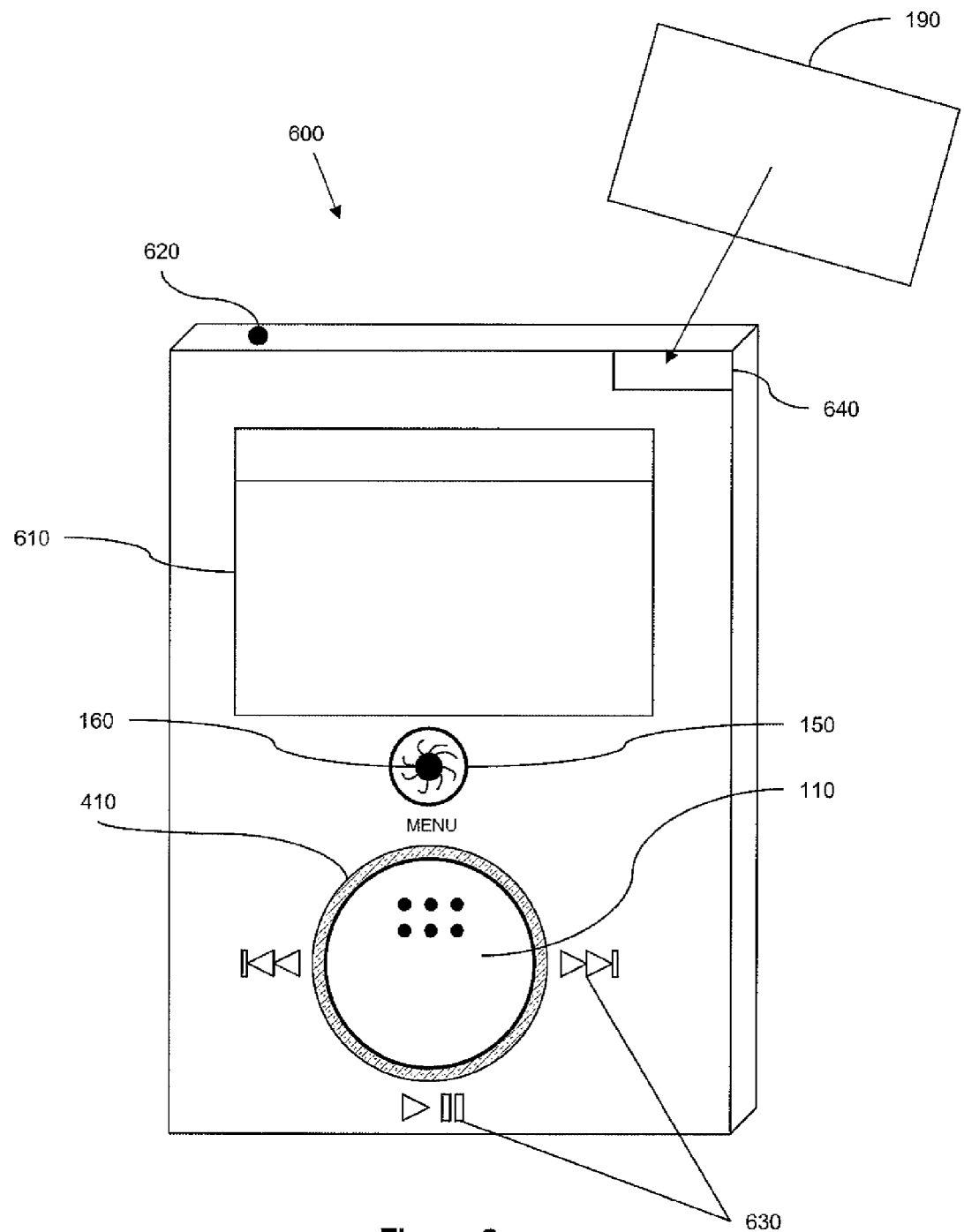
FIG. 6 is a perspective view of one embodiment of a portable media player configured to interface with a portable data device.

FIG. 6 illustrates one embodiment of an interface system employing a portable media player 600. The portable media player 600 may be configured to play music files, such as MP3s, AAC, MPEG, Ogg Vorbis, mp3PRO, AC-3, ATRAC, WMA, QDesign, AMR-WB+, RealAudio, SPEEX WAV files, or any other known or later developed type of audio file. The portable media player 600 may also be configured to play video files, such as MPEG, H.261, H.263, DivX, Xvid, 3ivx, VP6, Sorensen 3, Theora, WMV, RealVideo, Cinepak, or any other known or later developed type of video file. In the illustrated embodiment, the media player 600 includes a view screen 610, a headphone jack 620, and a built-in docking station with a socket 410 for receiving the portable data device 110. In the illustrated embodiment, the media player 600 further includes a joystick 150 with a button 160, such as described above with reference to FIGS. 1 and 2. In one embodiment, a user may retrieve data stored on the personal data device 110 by using the joystick 150 or integrated buttons 630. Alternatively, the user may retrieve data stored on the personal data device 110 by using the personal data device 110 as a track-ball. In one embodiment, the view screen 610 is a touch screen that can be used to interface with the media player 600 and retrieve data stored on the personal data device 110.

In the illustrated embodiment, the media player 600 further includes a scanner 640. In one embodiment, the scanner 640 is configured to scan objects optically, scan objects using radio frequency, or scan objects with any other known means of scanning. The scanner 640 may be used to scan data cards 190, such as any of the data cards described above with reference to FIG. 1, or any other physical object.

Figure 7:
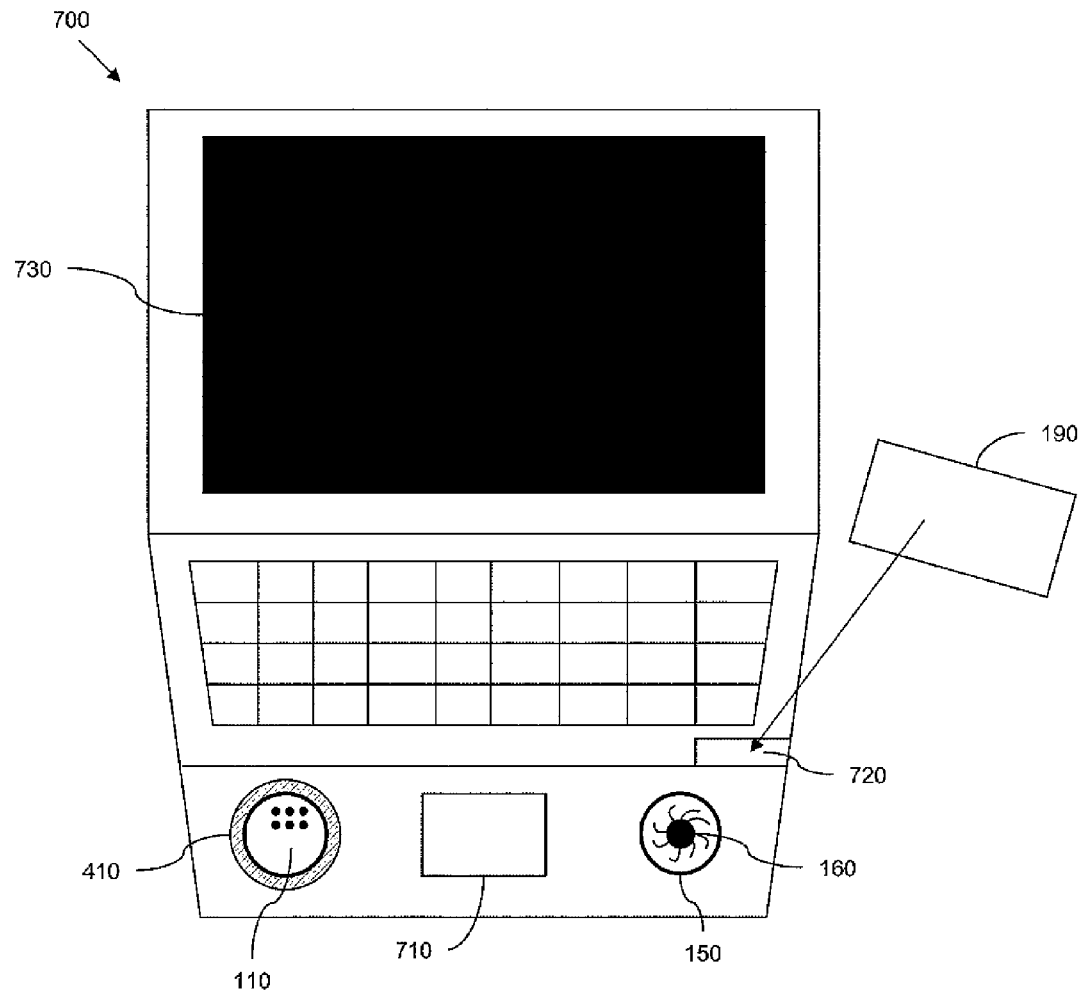
FIG. 7 is a diagrammatic view of one embodiment of a portable computer device configured to interface with a portable data device.

FIG. 7 illustrates one embodiment of an interface system employing a laptop computer 700 having a built-in docking station with a socket 410 for receiving the portable data device 110. In the illustrated embodiment, the laptop computer further includes a joystick 150 with a button 160, such as described above with reference to FIGS. 1 and 2. In one embodiment, a user may retrieve data stored on the personal data device 110 by using a touch pad 710, a mouse (not shown), or the joystick 150. Alternatively, the user may retrieve data stored on the personal data device 110 by using the personal data device 110 as a track-ball.

In the illustrated embodiment, the laptop computer 700 further includes a scanner 720. In one embodiment, the scanner 720 is configured to scan objects optically, scan objects using radio frequency, or scan objects with any other known means of scanning. The scanner 720 may be used to scan data cards 190, such as any of the data cards described above with reference to FIG. 1 or any other physical object.

In one embodiment, the laptop computer 700 recognizes the presence of the portable data device 110 and activates the touch pad 710 that also acts as a viewing box through which a user can view pictures and other media stored on the portable data device 110, without opening up a new browser on the main viewing screen 730. In another embodiment, the touch pad 710 acts as a viewing box for web sites in real time without opening up a browser on the main viewing screen 730. Thus, the touch pad 710 is an external viewing box for media. It should be understood that this embodiment is not limited to laptop computers and that in alternative embodiments, notebooks, tablets, or other portable computers can have a built-in docking station and touch pad as described above.

Figure 8:
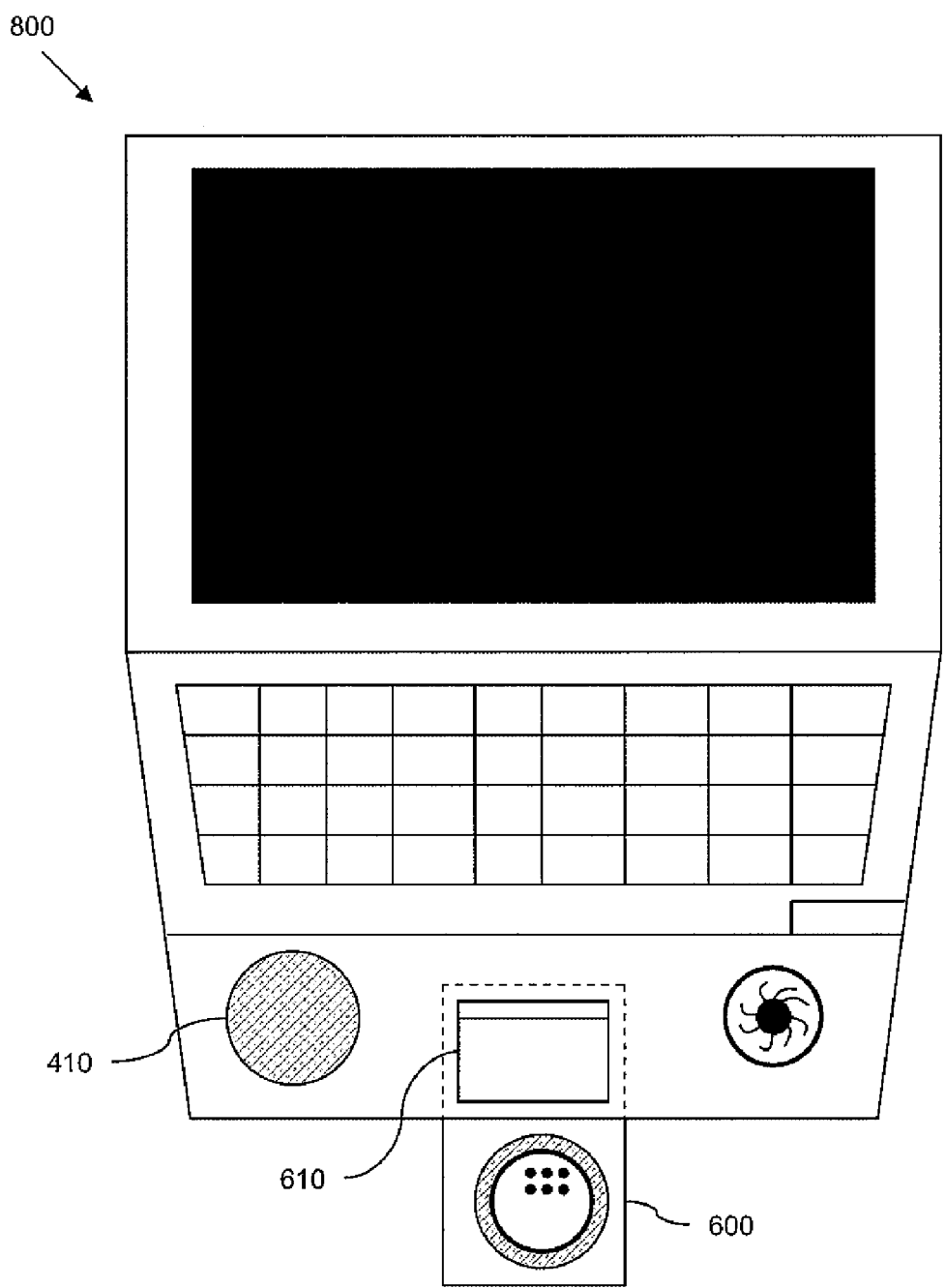
FIG. 8 is a diagrammatic view of an alternative embodiment of a portable computer device configured to interface with a portable data device and a portable media player.

FIG. 8 illustrates an alternative embodiment of a laptop computer 800 configured to interface with a portable data device 110 and a portable media player 600. The laptop computer 800 is substantially the same as the laptop computer 700 described above with reference to FIG. 7, except that the touchpad has been replaced with a docking station for a media player, such as the media player 600 described above with reference to FIG. 6. In the illustrated embodiment, the view screen 610 is a touch screen that can perform the same functions as the touchpad 710 of the laptop computer 700.

In the illustrated embodiment, the socket 410 of the laptop is empty and a portable data device 110 is instead placed in a socket of the media player 600. It should be understood that the portable data device 110 may be docked with either component. In an alternative embodiment (not shown), the laptop computer 800 may receive a media player that does not include a socket for a portable data device.

Figure 9:
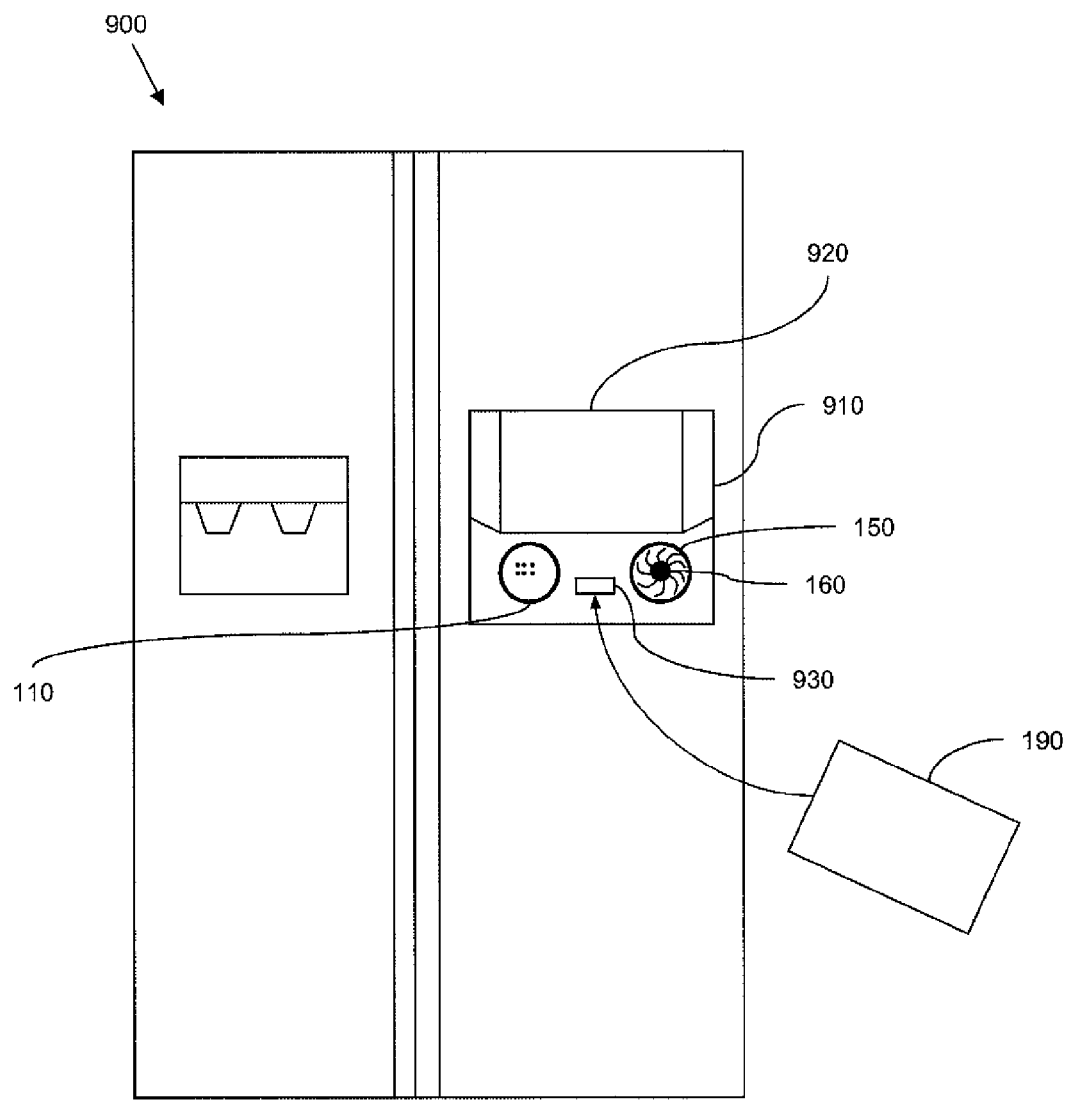
FIG. 9 is a front view of a household appliance configured to interface with one embodiment of a portable data device.

FIG. 9 illustrates one embodiment of an interface system employing a refrigerator 900. It should be understood that the refrigerator 900 is merely exemplary and that any appliance may be employed as an interface. In this embodiment, the portable data device 110 can be taken from a computer to the refrigerator 900 and docked with an integrated docking station 910. In one embodiment, the refrigerator 900 is an Internet-ready refrigerator having a screen 920 and an optional joystick 150 with a button 160 for interfacing with the Internet. The portable data device 110 may also be used as a track-ball for interfacing with the Internet.

In one embodiment, the refrigerator 900 further includes a scanner 930. In one embodiment, the scanner 930 is configured to scan objects optically, scan objects using radio frequency, or scan objects with any other known means of scanning. The scanner 930 may be used to scan data cards 190, such as any of the data cards described above with reference to FIG. 1, or any other physical object.

In one embodiment, the refrigerator 900 is a "smart" refrigerator capable of scanning items that are placed inside or removed from the refrigerator and keeping an inventory. In one embodiment, a user manually scans item by using the scanner 930. In an alternative embodiment, the refrigerator 900 further includes an internal scanning system that automatically scans items as they are placed in or removed from the refrigerator. The refrigerator 900 may be configured to automatically generate a shopping list comprised of staple items, such as milk, eggs, juice, butter, etc., when such items are no longer present in the refrigerator. In one embodiment, the user may program the refrigerator to designate any item as a "staple" item. In an alternative embodiment, a user may scan recipe cards with the scanner 930. The refrigerator may be configured to take inventory of the items inside and determine which items are needed to make the recipe. These items are then added to a grocery list. The grocery list may be downloaded to the portable data device 110. Grocery stores may be equipped with kiosks or other docking stations that allow a user to view and/or print the shopping list and identify where the items are located in the store. The kiosk or docking station may be configured to generate a "smart" list that is organized according to the store layout, thereby ensuring that the user's shopping trip is made as efficiently as possible. In an alternative embodiment, the refrigerator 900 may be programmed to automatically order the items on the shopping list over the Internet.

In another embodiment, a user may scan coupon cards with the scanner 930 so that coupons or discounts are downloaded onto the portable data device 110. In one embodiment, checkout counters at grocery stores may be equipped with docking stations that allow a user to quickly use multiple coupons during checkout.

Figure 10:
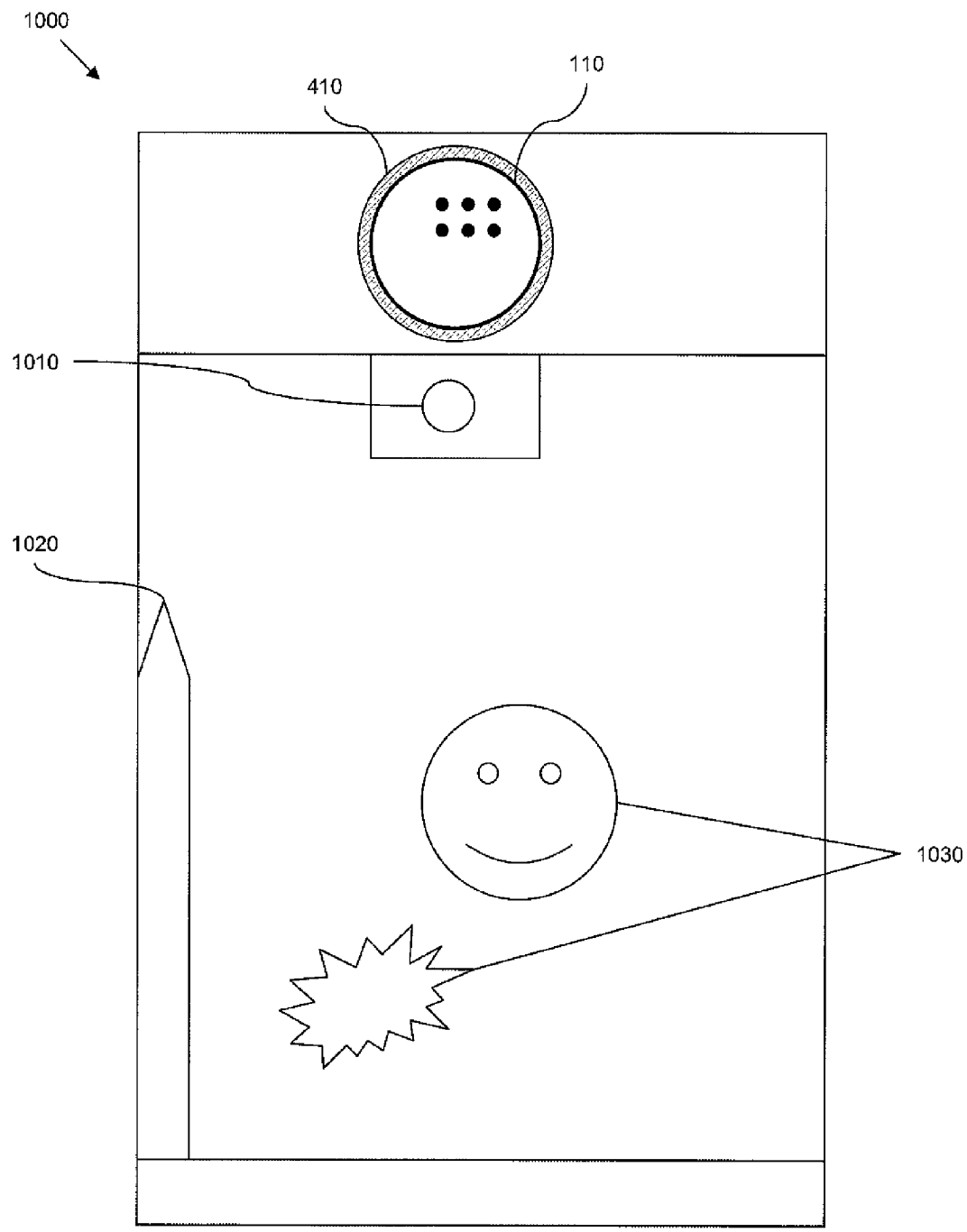
FIG. 10 is a front view of a tablet/sketchpad configured to interface with one embodiment of a portable data device.

FIG. 10 illustrates one embodiment of an interface system employing a tablet/sketchpad 1000. The portable data device 110 can be used to speak and write instant messages and the like. The portable data device 110 can be attached to a tablet/sketchpad 1000 so that messages are saved onto the portable data device 110. FIG. 10 illustrates a tablet/sketchpad having a built-in docking station with socket 410 for receiving the portable data device 110. The tablet/sketchpad 1000 may further include a camera 1010 for capturing still images or video images and storing them in the portable data device 110 or uploading them to the Internet. The tablet/sketchpad 1000 may be further configured to capture images drawn on the tablet with a writing instrument 1020. The writing instrument 1020 may be a pen, pencil, stylus, or other suitable instrument. Images, such as the exemplary images 1030, may be captured and stored on the portable data device 110 or transmitted to another computer device (not shown) or a network (not shown) through a wired or wireless connection.

Figure 11:
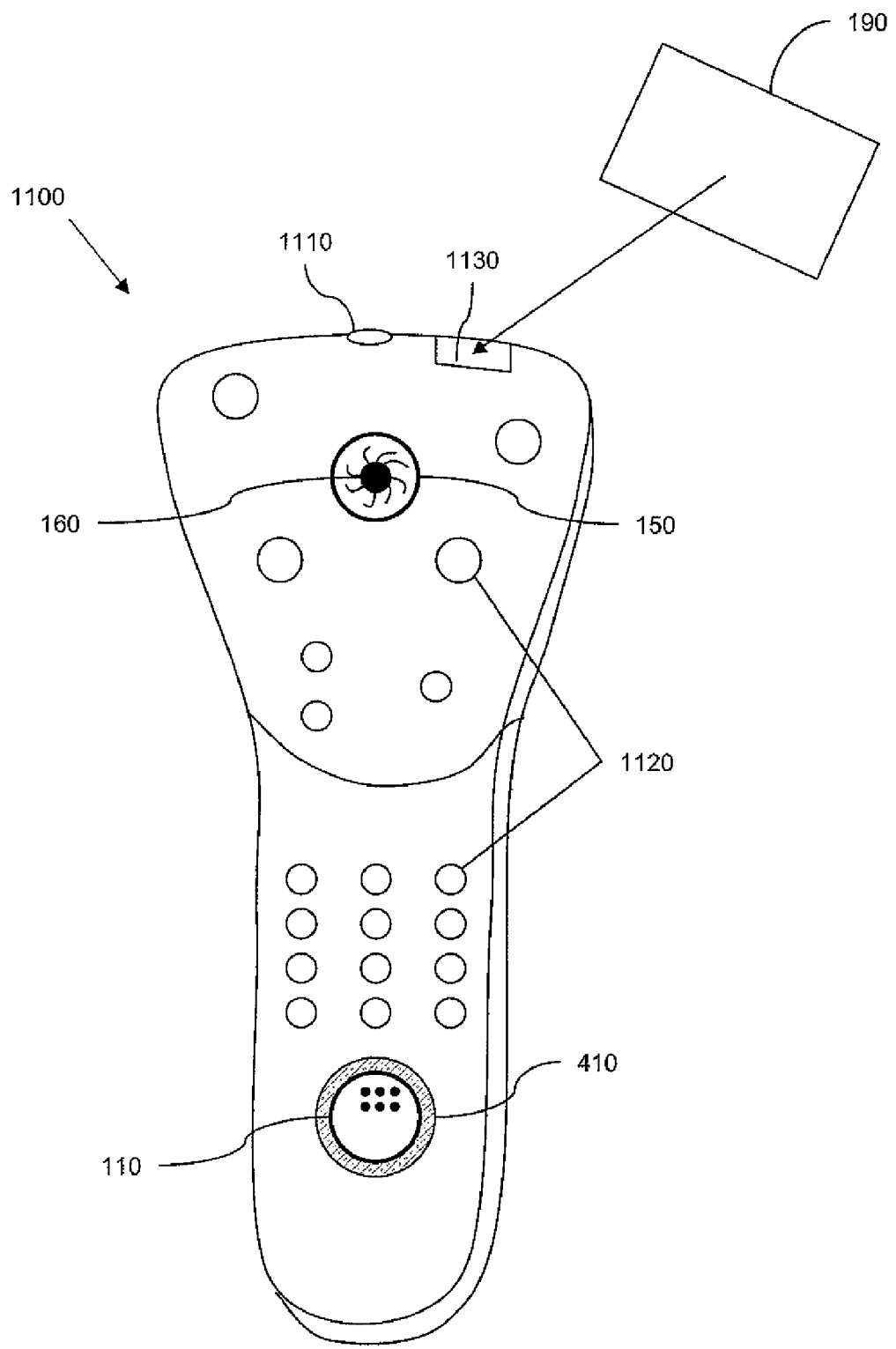
FIG. 11 is a perspective view of a television remote control configured to interface with one embodiment of a portable data device.

FIG. 11 illustrates one embodiment of an interface system employing remote control 1100. In this embodiment, the remote control 1100 includes a built-in docking station with socket 410 for receiving the portable data device 110. The remote control 1100 further includes an output 1110 for wireless interfacing with an electronic component such as a television, a video player, a video recording device, a stereo or other audio player, a computer, a cable or satellite interface, a video game console, or any other known electronic devices. The output 1110 may output infrared signals, radio frequency signals, Bluetooth, or any other known wireless communication signals. The remote control 1100 further includes a plurality of buttons 1120 for entering commands.

In the illustrated embodiment, the remote control 1100 further includes a joystick 150 with a button 160, such as described above with reference to FIGS. 1 and 2. In one embodiment, a user may interface with electronic components or retrieve data stored on the personal data device 110 by using the joystick 150 or buttons 1120. Alternatively, the user may interface with electronic components or retrieve data stored on the personal data device 110 by using the personal data device 110 as a track-ball.

With continue reference to FIG. 11, the remote control 1100 farther includes a scanner 1130. In one embodiment, the scanner 1130 is configured to scan objects optically, scan objects using radio frequency, or scan objects with any other known means of scanning. The scanner 1130 may be used to scan data cards 190, such as any of the data cards described above with reference to FIG. 1, or any other physical object. In one embodiment, a user may scan television listings with the scanner 1130 to program a video recording device, or to change the channel on a television or cable or satellite interface at a prescribed time. In an alternative embodiment, a user may scan television listings with the scanner 1130 to store the titles and information of favorite shows in the portable data device 110. The user may then use the portable data device 110 to a location having different television service. The user may dock the portable data device 110 with a remote control in the new location, and the remote control and/or the television or cable or satellite interface may be configured to locate the correct channel showing the user's favorite show.

In another alternative embodiment, a user may store media on the portable data device 110 or scan media cards with the scanner 1130. The user may then command the remote control 1100 to output the media through the output 1110 to a television, computer, stereo, or other electronic device.

In an alternative embodiment (not shown), the remote control 1100 may further include a display screen or a touch screen to convey information to the user.

Figure 12:
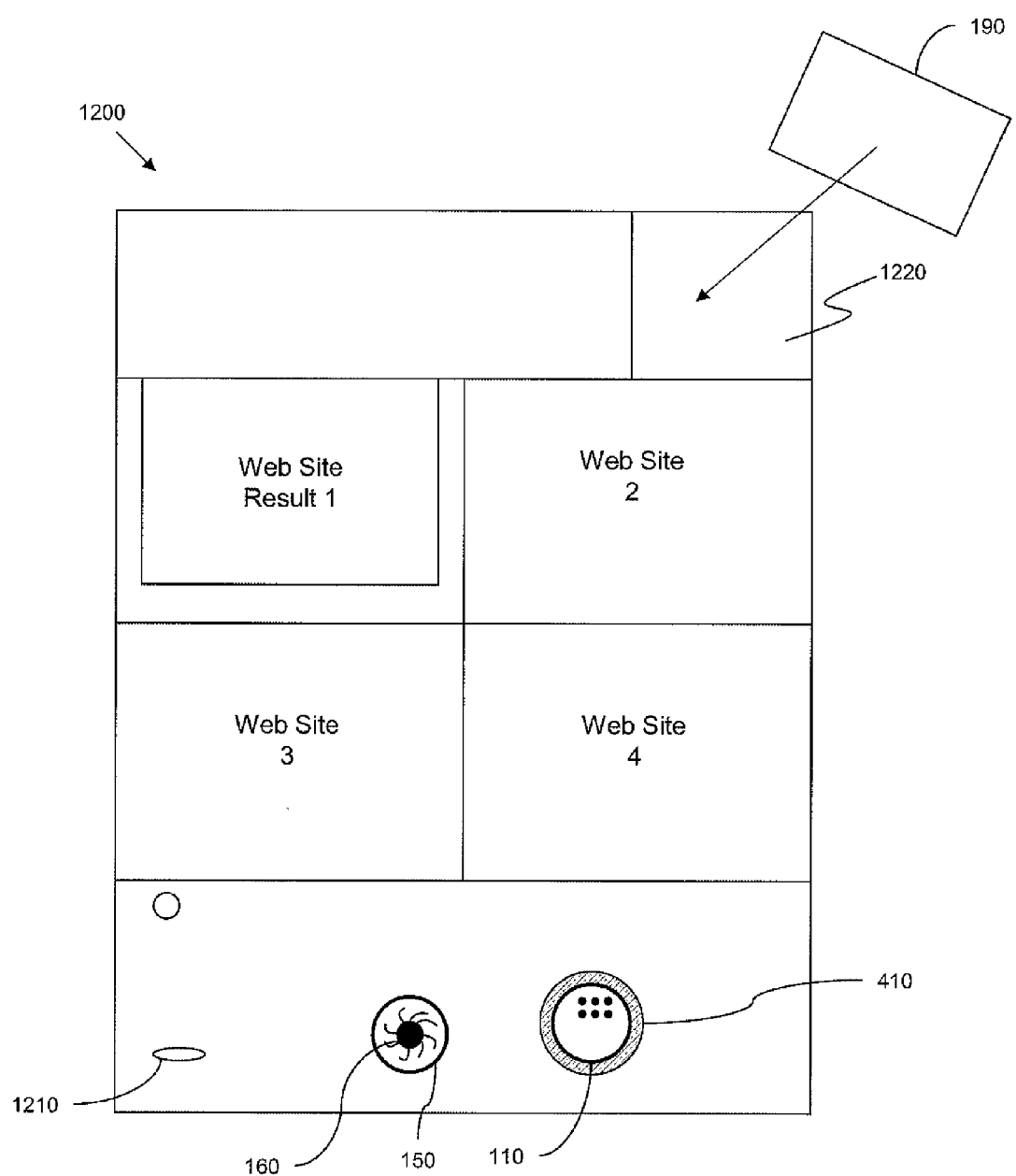
FIG. 12 is a diagrammatic view of a website viewer with a user interface.

FIG. 12 illustrates one embodiment of an interface system employing website viewer 1200. The portable data device 110 can be used to interact with a website viewer. FIG. 12 illustrates a website viewer having a built-in docking station with socket 410 for receiving the portable data device 110. In the illustrated embodiment, a user may view or preview multiple websites at the same time with the website viewer 1200. The website viewer 1200 further includes a speed indicator 1210 that indicates network connection speed.

In the illustrated embodiment, the website viewer 1200 further includes a joystick 150 with a button 160, such as described above with reference to FIGS. 1 and 2. In one embodiment, a user may interface with websites or retrieve data stored on the personal data device 110 by using the joystick 150. Alternatively, the user may interface with websites or retrieve data stored on the personal data device 110 by using the personal data device 110 as a track-ball.

In the illustrated embodiment, the website viewer 1200 further includes a scanner 1220. In one embodiment, the scanner 1220 is configured to scan objects optically, scan objects using radio frequency, or scan objects with any other known means of scanning. The scanner 1220 may be used to scan data cards 190, such as any of the data cards described above with reference to FIG. 1, or any other physical object.

Figure 13:
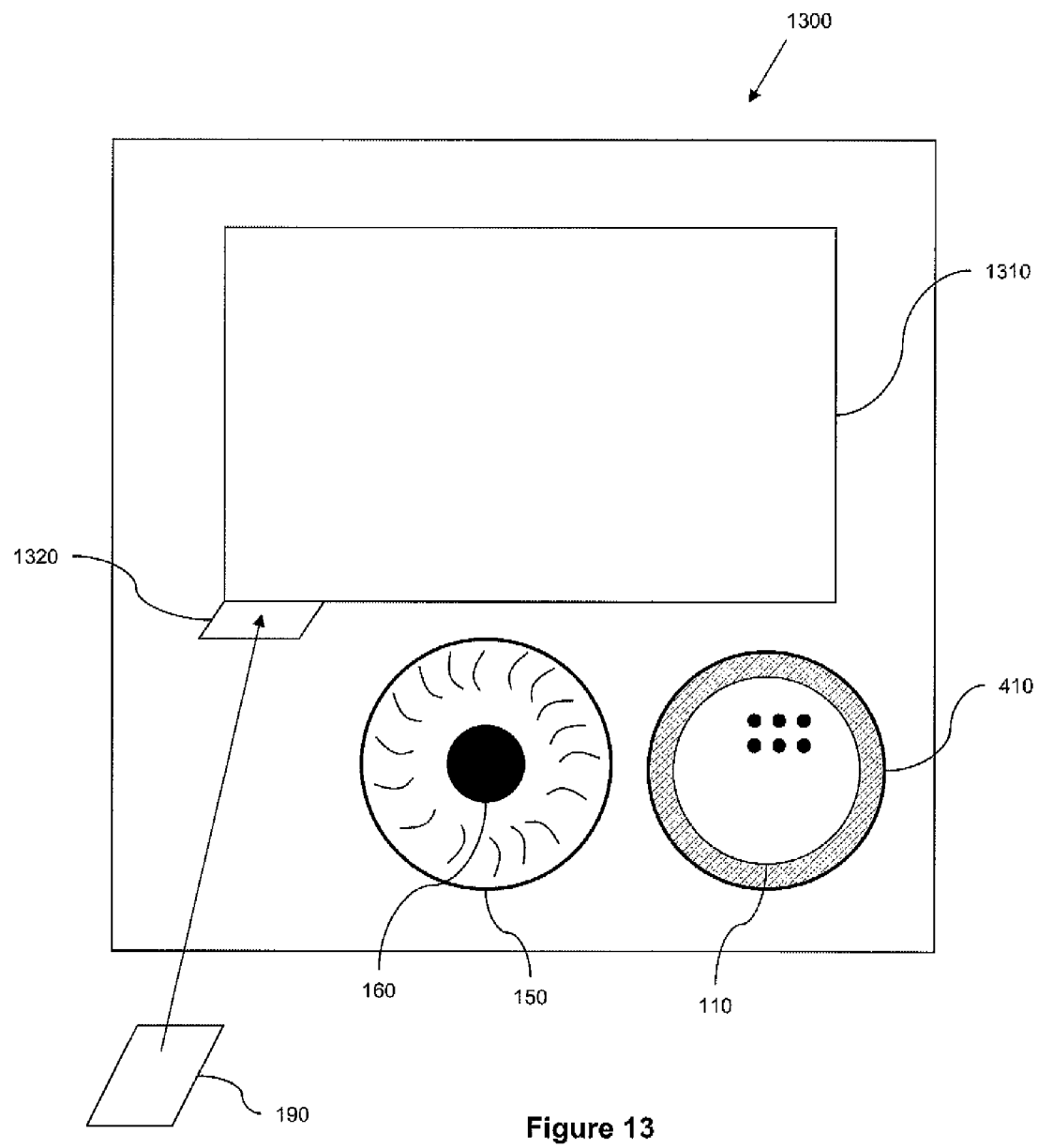
FIG. 13 is a diagrammatic view of a motor vehicle computer system configured to interface with one embodiment of a portable data device.

FIG. 13 illustrates one embodiment of an interface system employing motor vehicle. In one embodiment, at least one of a dashboard or a seat of a car are equipped with a vehicular interface 1300 that includes a socket 410 for the portable data device 110. In the illustrated embodiment, the vehicular interface 1300 includes a screen 1310 for viewing driving directions, videos, and the like.

In the illustrated embodiment, the vehicular interface 1300 further includes a joystick 150 with a button 160, such as described above with reference to FIGS. 1 and 2. In one embodiment, a user may interface with the screen 1310 or retrieve data stored on the personal data device 110 by using the joystick 150. Alternatively, the user may interface with the screen 1310 or retrieve data stored on the personal data device 110 by using the personal data device 110 as a track-ball.

In the illustrated embodiment, the vehicular interface 1300 further includes a scanner 1320. In one embodiment, the scanner 1320 is configured to scan objects optically, scan objects using radio frequency, or scan objects with any other known means of scanning. The scanner 1320 may be used to scan data cards 190, such as any of the data cards described above with reference to FIG. 1, or any other physical object.

Figure 14:
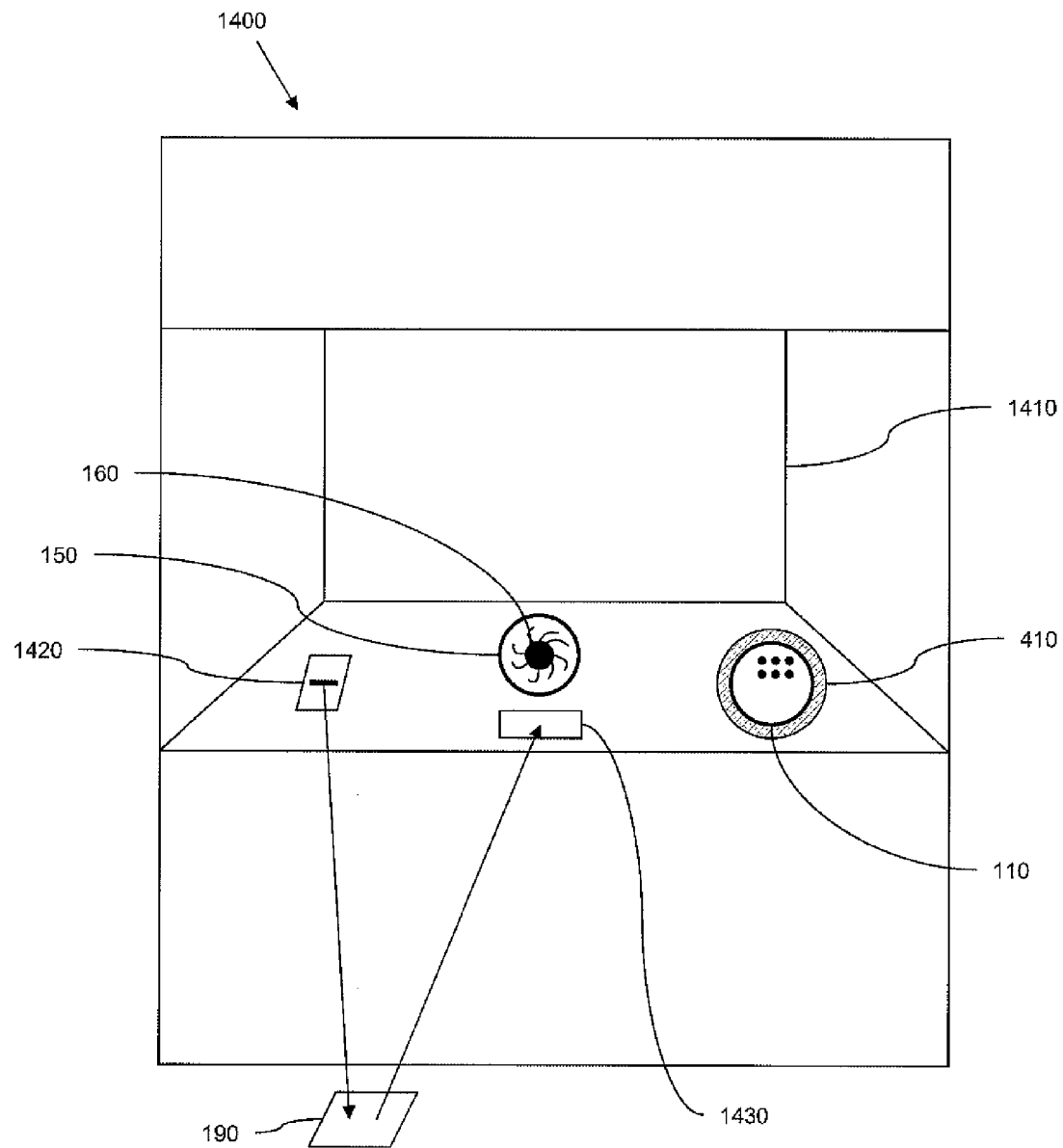
FIG. 14 is a front view of a kiosk configured to interface with one embodiment of a portable data device.

FIG. 14 illustrates one embodiment of an interface system employing a kiosk 1400 that can be used to download information to a portable data device 110 through a socket 410. In the illustrated embodiment, the kiosk 1400 includes a screen 1410 for viewing driving directions, videos, and the like.

In the illustrated embodiment, the kiosk 1400 further includes a joystick 150 with a button 160, such as described above with reference to FIGS. 1 and 2. In one embodiment, a user may interface with the screen 1410 or retrieve data stored on the personal data device 110 by using the joystick 150. Alternatively, the user may interface with the screen 1410 or retrieve data stored on the personal data device 110 by using the personal data device 110 as a track-ball.

In the illustrated embodiment, the kiosk 1400 further includes a data card dispenser 1420. In this embodiment, a user may purchase the data cards through the kiosk by using credit card or bank account information stored in the portable data device 110. The requested data is then written to the data card 190 and dispensed by the data card dispenser 1420. Alternatively, the requested data may be downloaded directly to the personal data device 110.

With continued reference to FIG. 14, the kiosk 1400 further includes a scanner 1430. In one embodiment, the scanner 1430 is configured to scan objects optically, scan objects using radio frequency, or scan objects with any other known means of scanning. The scanner 1430 may be used to scan data cards 190, such as any of the data cards described above with reference to FIG. 1, or any other physical object.

It is apparent from the above that the portable data device 110 wirelessly interacts with other mobile devices such as, for example, mobile phones, MP3 players, PDAs, tablet PCs, earpieces, and the like, is compact and portable, is ergonomically shaped to fit in the palm of the user's hand, can be spoken to by the user and can communicate to the user, and stores information as a portable hard drive.

Figure 15A:
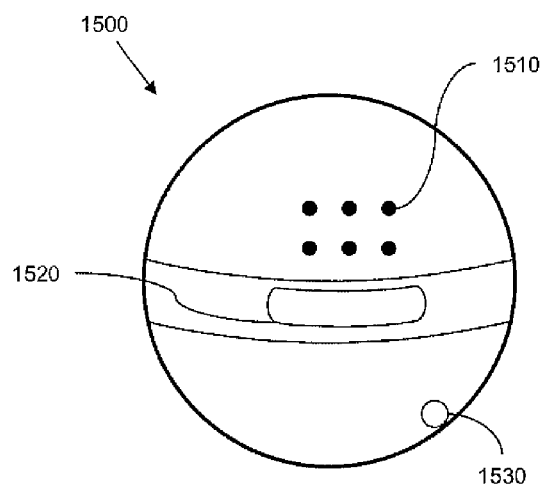
FIGS. 15A-15C are front, top, and bottom views, respectively of an alternative embodiment of a portable data device.
Figure 15B:
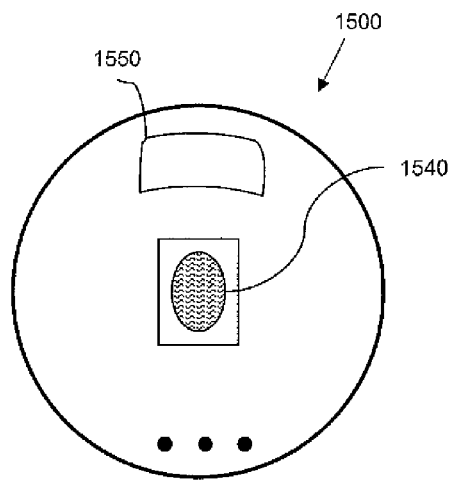
Figure 15C:
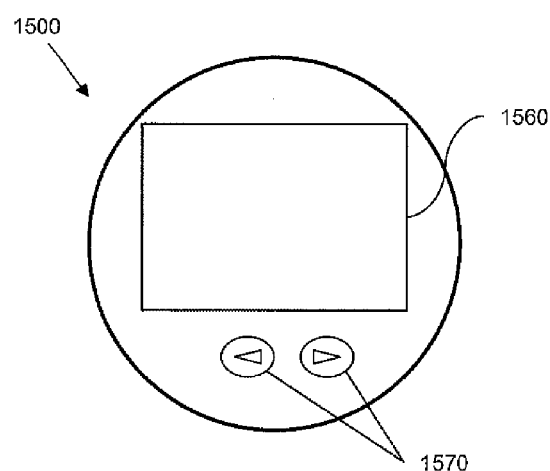

Turning now to FIGS. 15A-15C, an alternative embodiment of a portable data device 1500 is shown. The portable data device 1500 includes one or more human interfaces for receiving input from a user and/or conveying information to a user. FIG. 15A illustrates a front view of the portable data device 1500. In the illustrated embodiment, in addition to a microphone 1510, the portable data device 1500 has a built-in LCD display screen 1520 or other suitable display for providing visual information to the user and a built-in camera 1530 for receiving visual information.

FIG. 15B illustrates a top-view of the portable data device 1500. In the illustrated embodiment, the portable data device 1500 includes a fingerprint scanner 1530. In one embodiment, the portable data device 1500 may be "locked" until a registered user scans his or her finger over the fingerprint scanner 1540. It is noted that the portable data device 1500 can additionally or alternatively be provided with any other suitable biometric or identification device such as, for example, a retinal scanner or the like. In the illustrated embodiment, the portable data device 1500 further includes a scanner 1550 configured to scan objects optically, scan objects using radio frequency, or scan objects with any other known means of scanning. The scanner 1550 may be used to scan data cards 190, such as any of the data cards described above with reference to FIG. 1, or any other physical object.

FIG. 15C illustrates a bottom-view of the portable data device 1500. In the illustrated embodiment, the portable data device 1500 has a display screen 1560 for viewing pictures, videos, websites and the like. In one embodiment, a user may interface with the portable data device by pressing buttons 1570 or by audibly providing instructions in the microphone 1510. In an alternative embodiment, the display screen 1560 is a touch screen for receiving user input.

Figure 16:
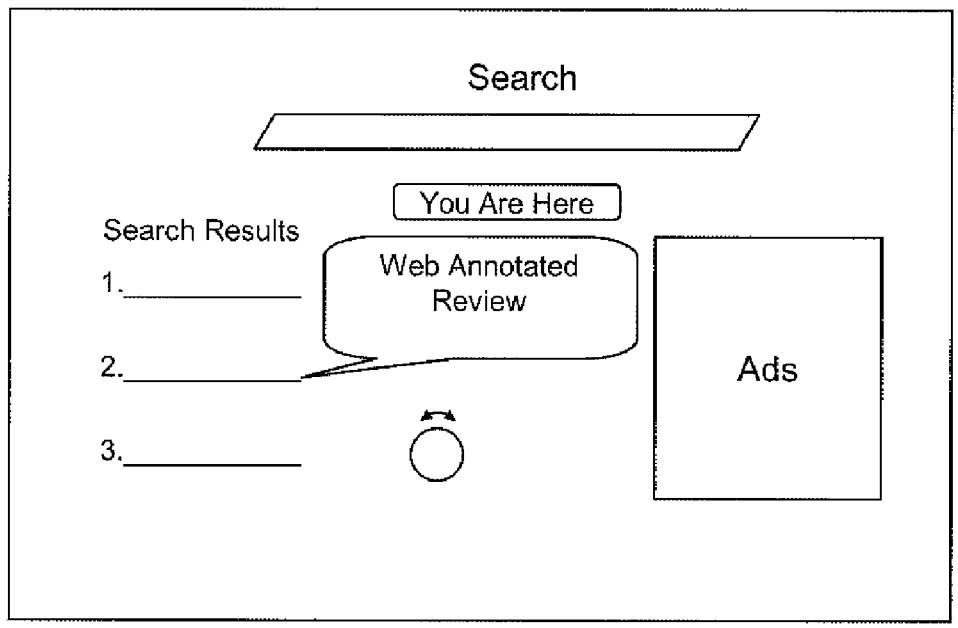
FIG. 16 is a diagrammatic view of a search engine with a website preview button.
Figure 17:
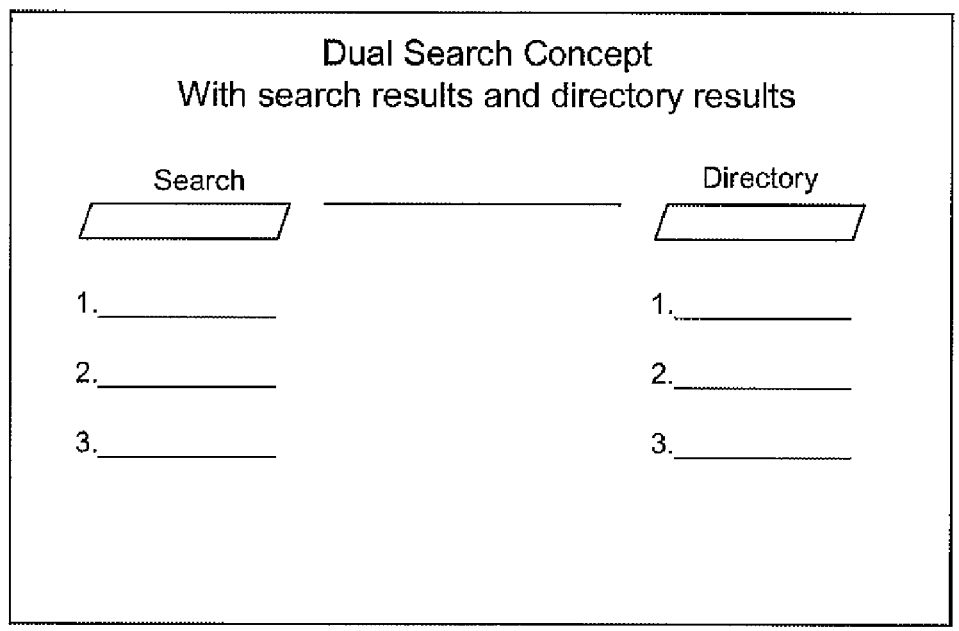
FIG. 17 is a diagrammatic view of search engine results having both search and directory suggestions.

FIGS. 16 and 17 illustrate how the "you are here" button integrated in a search engine can show the search user where they are with a live, not cached, image of the website as well as a box which provides a handpicked annotated review of the website when available. This also provides speech interaction and voice interaction where the search results can read the annotated review to you and the websites can be searched within the search results, as well as blogs searched separately within the original search results via a blog search engine. This concept works in tandem with the docking station 120 and devices with built-in docking stations such as, for example, the viewers. The search engine will recognize installation of the docking station 120 and then will add the "you are here" button as an option to its search and search results. "You are here" search results are denoted with an icon, and when the icon is clicked, a preview image of the site along with annotation is shown to the user. Words in annotation can be used with hyperword technology to search within the website, or to search the web.

Figure 18:
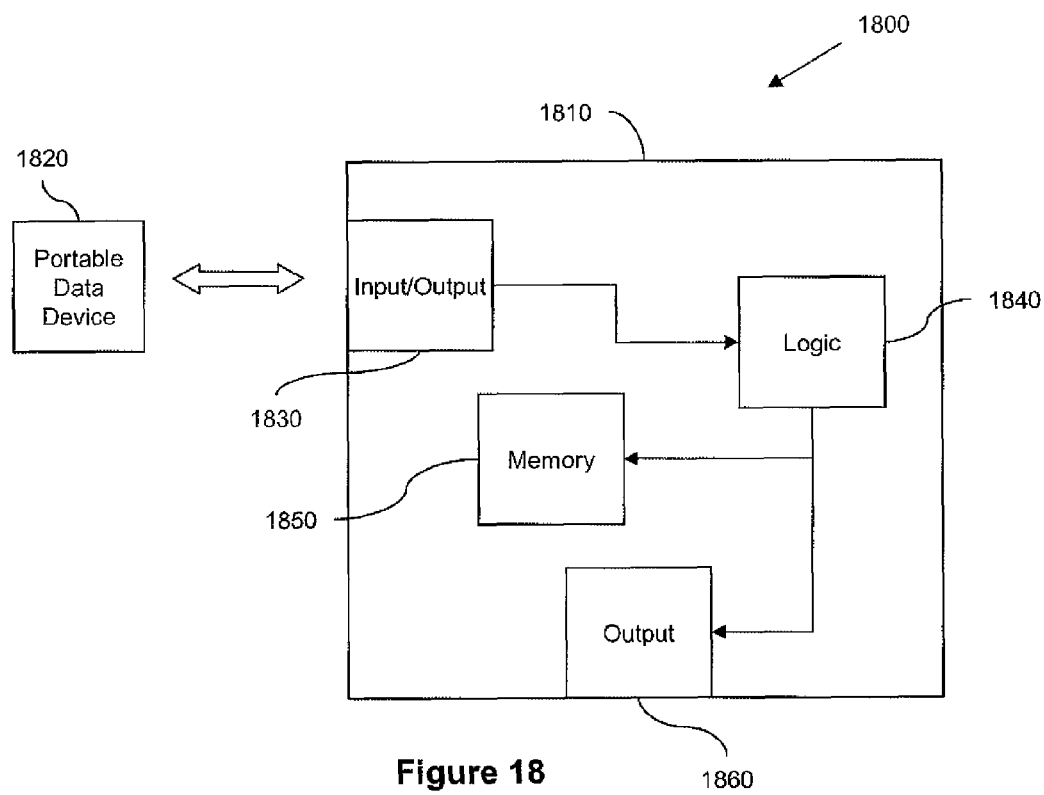
FIG. 18 is a schematic drawing of a computer interface system.

FIG. 18 illustrates a schematic of one embodiment of a general computer interface system 1800 that includes a computing device 1810 and a portable data device 1820. The computing device 1810 may be a computer, a portable music player, a household appliance, a vehicle, a telephone, a remote control, or any other known computing device. As shown in the illustrated embodiment, the computing device 1810 includes an input/output 1830 configured to receive and/or transmit signal communication from the portable data device 1820. In one embodiment, the input/output 1830 is configured to wirelessly communicate with the portable data device 1820 through radio frequency signals, infrared signals, or other known wireless signals. In one embodiment, the portable data device 1820 is configured to transmit data through physical manipulation of the device. For example, in one embodiment, the portable data device 1820 is spherical and can transmit and/or receive data when a user rotates or spins the portable data device 1820 while the device is docked in the input/output 1830 of the computing device 1810. In an alternative embodiment, the input/output 1830 may be configured communicate with the portable data device 1820 through a wired connection or other physical connection.

With continued reference to FIG. 18, the computing device 1810 further includes logic 1840. The logic 1840 may be configured to process data received from the input/output 1830, store data in a memory 1850, or send data to an output 1860. The memory 1850 may be, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other known, or later developed memory. The output 1860 may be a display, one or more speakers, or other known output device. Alternatively, the output may be a wireless or a wired output to a network or a second computing device.

Figure 19:
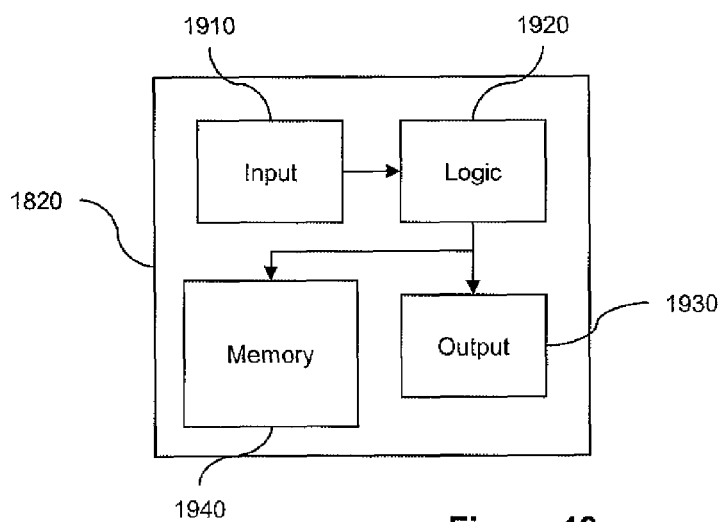
FIG. 19 is a schematic drawing of a portable data device.

FIG. 19 illustrates a more detailed schematic of one embodiment of the portable data device 1810 of FIG. 18. In one embodiment, the portable data device includes an input 1910 configured to receive input from a user and/or to receive signal communication from a computing device. For example, the input 1910 may be a human interface such as a microphone, a touchscreen, a scanner, a fingerprint scanner, one or more buttons, or other known human interfaces. Additionally, the input 1910 may be, for example, a wireless signal receiving device or a wired connection for receiving data from an external device.

With continued reference to FIG. 19, in one embodiment, the portable data device further includes logic 1920. The logic 1920 may be configured to process data received from the input 1910, store data in a memory 1930, or send data to an output 1940. The memory 1930 may be, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other known, or later developed memory. The output 1940 may be configured to output data to a user and/or to an external computing device. For example, the output 1940 may be a display, one or more speakers, or other known output device. Alternatively, the output may be a wireless or a wired output to a network or a second computing device.

While the present application has been illustrated by the description of embodiments thereof, and while the embodiments have been described in some detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, on the illustrative embodiments shown and described. Accordingly, departures may be made from such details without departing from the spirit or scope of the applicant's general inventive concept.

The invention claimed is:

1. A system comprising:
   a substantially spherical portable data device having a memory and a wireless interface configured to transmit data stored in the memory;
   a remote control device configured to wirelessly interface with an electronic device selected from the group consisting of a television, a video player, a video recording device, a stereo, an audio player, a cable interface, and a satellite interface, the remote control device having a socket configured to receive the substantially spherical portable data device,
   wherein the socket has a shape corresponding to the substantially spherical portable data device and is configured to wirelessly receive and transmit data to the substantially spherical portable data device, and
   wherein the substantially spherical portable data device transmits data to the remote control device by being rotated in the socket by a user.

2. The system of claim 1, wherein the remote control device further includes a joystick.

3. The system of claim 1, wherein the substantially spherical portable data device includes a human interface for receiving data from a user.

4. The system of claim 3, wherein the human interface includes at least one of a microphone, a scanner, a thumbprint scanner, a touch pad, a touch screen, and a button.

5. The system of claim 1, wherein the remote control device further includes a scanner for scanning physical objects.

6. The system of claim 1, wherein the substantially spherical portable data device stores data related to a user selected television program, and the remote control device has logic configured to locate a local television channel associated with the user selected television program.

7. A portable data device configured to interface with a remote control device that wirelessly interfaces with an entertainment device selected from the group consisting of a television, a video player, a video recording device, a stereo, an audio player, a cable interface, and a satellite interface, the portable data device comprising:
  a memory configured to store user data;
  a wireless interface configured to transmit the user data to the remote control device and further configured to receive data from the remote control device,
  wherein the portable data device is configured to receive user commands through a physical manipulation of the portable data device with respect to the remote control device, and
  wherein the portable data device is substantially spherical,
  wherein, docking the portable data device in a docking portion of the remote control device and subsequently rotating the portable data device causes the portable data device to transmit the user commands to the remote control device, and
  wherein the remote control device is configured to wirelessly transmit the user commands to the entertainment device.

8. The portable data device of claim 7, further comprising an input for receiving data when the portable data device is not in communication with the remote control device.

9. The portable data device of claim 8, wherein the input includes at least one of a microphone, a scanner, a thumbprint scanner, a touch pad, a touch screen, and a button.

10. The portable data device of claim 7, wherein the memory stores user payment information and is configured to interface with a payment processing device.

11. The portable data device of claim 7, further comprising GPS circuitry.

12. The portable data device of claim 7, wherein the memory is configured to store data related to a user selected television program, and the portable data device is configured to transmit the user selected television program to the remote control device, which is configured to transmit the user selected television program to the entertainment device.

13. A remote control device configured to wirelessly interface with an entertainment device selected from the group consisting of a television, a video player, a video recording device, a stereo, an audio player, a cable interface, and a satellite interface, the remote control device comprising:
  a socket configured to receive a substantially ball-shaped portable data device, the socket having circuitry configured to receive data from the substantially ball-shaped portable data device when the substantially ball-shaped portable data device is both in contact with the socket and is being rotated relative to the socket;
  a user interface for interfacing with the remote control device;
  logic configured to receive data from the circuitry of the socket, and data from the user interface; and
  an output configured to output data received by the logic to the entertainment device.

14. The remote control device of claim 13, wherein the substantially ball-shaped portable data device includes means for inputting data.

15. The remote control device of claim 13, wherein the logic is further configured to receive data from a data card that contains a pointer to a database.

16. The remote control device of claim 13, wherein the logic is further configured to receive data from a data card containing an embedded data file.

17. The remote control device of claim 13, wherein the logic is further configured to receive data from one of a disk, a chip, clothing, a magazine, a newspaper, a fingerprint, and a food product.

18. The remote control device of claim 13, wherein the logic is configured to receive data related to a user selected television program from the socket, and is further configured to locate a local television channel associated with the user selected television program.

19. The remote control device of claim 18, wherein the output is configured to output data related to the located local television channel to the entertainment device.

* * * * *